United States Patent
Hasser

(10) Patent No.: US 6,704,683 B1
(45) Date of Patent: Mar. 9, 2004

(54) DIRECT VELOCITY ESTIMATION FOR ENCODERS USING NONLINEAR PERIOD MEASUREMENT

(75) Inventor: Christopher J. Hasser, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 09/300,147

(22) Filed: Apr. 27, 1999

Related U.S. Application Data

(60) Provisional application No. 60/082,637, filed on Apr. 28, 1998.

(51) Int. Cl.[7] .............................................. G01P 3/00
(52) U.S. Cl. ........................ 702/147; 702/145; 324/165
(58) Field of Search ........................ 702/142, 94, 147, 702/145, 146, 150, 152, 158; 345/161, 157, 156; 324/165; 73/118.1

(56) References Cited

U.S. PATENT DOCUMENTS

| | | | |
|---|---|---|---|
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Corlyon et al. | |
| 3,623,064 A | 11/1971 | Kagan | |
| 3,727,046 A * | 4/1973 | Woods et al. | 256/182 C |
| 3,781,114 A * | 12/1973 | Marsh et al. | 356/139.02 |
| 3,902,687 A | 9/1975 | Hightower | |
| 3,903,614 A | 9/1975 | Diamond et al. | |
| 3,911,416 A | 10/1975 | Feder | |
| 3,919,691 A | 11/1975 | Noll | 340/172.5 |
| 4,103,155 A | 7/1978 | Clark | 250/231 |
| 4,114,882 A | 9/1978 | Mau | 273/85 |
| 4,160,508 A | 7/1979 | Salisbury, Jr. | |
| 4,236,325 A | 12/1980 | Hall et al. | |
| 4,257,377 A * | 3/1981 | Kinugawa | 123/492 |
| 4,385,836 A | 5/1983 | Schmitt | 356/374 |
| 4,485,337 A * | 11/1984 | Sandusky | 388/812 |
| 4,513,235 A | 4/1985 | Acklam et al. | |
| 4,520,445 A * | 5/1985 | Keeams | 301/37.372 |
| 4,581,491 A | 4/1986 | Boothroyd | |

(List continued on next page.)

FOREIGN PATENT DOCUMENTS

EP    0 349 086 A1    1/1990

OTHER PUBLICATIONS

Baigrie, "Electric Control Loading –A Low Cost High Performance Alternative," *Proceedings of Interservice/Industry Training Systems Conference*, pp. 247–254, Nov. 6–8, 1990.

Iwata, "Pen–based Haptic Virtual Environment," 0–7803–1363–1/93 IEEE, pp. 287–292, 1993.

Russo, "The Design and Implementation of a Three Degree of Freedom Force Output Joystick," *MIT Libraries Archives* pp. 1–131, May 1990, archived Aug. 14, 1990.

(List continued on next page.)

*Primary Examiner*—Marc S. Hoff
*Assistant Examiner*—Mohamed Charioui

(57) ABSTRACT

A method and apparatus for providing a direct velocity of a moving object using nonlinear period measurement. A pulse signal from an encoder indicates the detection of a passage of a point on a moving sensor element, such as a mark on an encoder disk. A counter is then made to count down from a higher value to a lower value, where counts by the counter are made at a variable, nonlinear rate. The rate is faster when the count begins and gets slower as the count continues, reducing the possibility that the counter will overflow before the next encoder signal is received. The counter value is output and the counter is reset when another encoder signal is received, where the output value is directly related to the velocity of the object. In a different method and apparatus, first and second values, such as PWM or DAC commands, are provided to an actuator to output as forces. The values are differenced a rate of change of the force values is determined. A force is output according to the rate of change until another force value is received, allowing more stable and continuous force output.

28 Claims, 9 Drawing Sheets

U.S. PATENT DOCUMENTS

| | | | |
|---|---|---|---|
| 4,599,070 A | 7/1986 | Hladky et al. | |
| 4,639,884 A | 1/1987 | Sagues | 364/565 |
| 4,678,908 A | 7/1987 | LaPlante | 250/231 |
| 4,680,466 A | 7/1987 | Kuwahara et al. | 250/231 |
| 4,708,656 A | 11/1987 | de Vries et al. | |
| 4,713,007 A | 12/1987 | Alban | |
| 4,728,954 A * | 3/1988 | Phelan et al. | 342/115 |
| 4,734,685 A | 3/1988 | Watanabe | 340/710 |
| 4,794,392 A | 12/1988 | Selinko | |
| 4,794,551 A * | 12/1988 | Yoshida | 702/145 |
| 4,795,901 A | 1/1989 | Kitazawa | 250/231 |
| 4,839,838 A | 6/1989 | LaBiche et al. | 364/709.11 |
| 4,851,771 A | 7/1989 | Ikeda et al. | 324/208 |
| 4,891,764 A | 1/1990 | McIntosh | |
| 4,925,312 A | 5/1990 | Onaga et al. | 364/513 |
| 4,930,770 A | 6/1990 | Baker | |
| 4,934,694 A | 6/1990 | McIntosh | |
| 4,961,038 A | 10/1990 | MacMinn | 318/696 |
| 5,006,703 A | 4/1991 | Shikunami et al. | 250/231.13 |
| 5,019,761 A | 5/1991 | Kraft | |
| 5,022,407 A | 6/1991 | Horch et al. | |
| 5,027,648 A * | 7/1991 | Filleau | 73/118.1 |
| 5,035,242 A | 7/1991 | Franklin et al. | |
| 5,038,089 A | 8/1991 | Szakaly | |
| 5,068,529 A | 11/1991 | Ohno et al. | 250/231.18 |
| 5,078,152 A | 1/1992 | Bond et al. | |
| 5,212,473 A | 5/1993 | Louis | |
| 5,240,417 A | 8/1993 | Smithson et al. | |
| 5,254,919 A | 10/1993 | Bridges et al. | 318/560 |
| 5,271,290 A | 12/1993 | Fischer | |
| 5,275,174 A | 1/1994 | Cook | |
| 5,299,810 A | 4/1994 | Pierce et al. | |
| 5,309,140 A | 5/1994 | Everett, Jr. et al. | |
| 5,334,027 A | 8/1994 | Wherlock | |
| 5,402,680 A | 4/1995 | Korenaga | 73/518 |
| 5,414,337 A | 5/1995 | Schuler | 318/561 |
| 5,466,213 A | 11/1995 | Hogan et al. | |
| 5,513,100 A | 4/1996 | Parker et al. | 364/167.01 |
| 5,547,382 A | 8/1996 | Yamasaki et al. | |
| 5,604,345 A | 2/1997 | Matsuura | 250/237 G |
| 5,696,535 A | 12/1997 | Rutledge et al. | 345/156 |
| 5,734,373 A | 3/1998 | Rosenberg et al. | 345/161 |
| 5,737,280 A * | 4/1998 | Kokubo | 368/2 |
| 5,739,811 A * | 4/1998 | Rosenberg et al. | 345/161 |
| 5,740,083 A | 4/1998 | Anderson et al. | 364/565 |
| 5,763,874 A | 6/1998 | Luciano et al. | 250/231.14 |
| 5,766,016 A | 6/1998 | Sinclair et al. | |
| 5,785,630 A | 7/1998 | Bobick et al. | |
| 5,808,568 A | 9/1998 | Wu | 341/20 |
| 5,841,133 A | 11/1998 | Omi | 250/231.13 |
| 5,844,673 A | 12/1998 | Ivers | 356/138 |
| 5,930,741 A | 7/1999 | Kramer | 702/153 |
| 5,999,168 A | 12/1999 | Rosenberg et al. | 345/161 |
| 6,020,875 A * | 2/2000 | Moore et al. | 345/156 |
| 6,067,077 A | 5/2000 | Martin et al. | 345/161 |
| 6,208,131 B1 * | 3/2001 | Cebis et al. | 325/165 |

OTHER PUBLICATIONS

Brooks et al., "Hand Controllers for Teleoperation –A State–of–the–Art Technology Survey and Evaluation," *JPL Publication 85–11*, NASA–CR–175890; N85–28559, pp. 1–84, Mar. 1, 1985.

Jones et al., "A perceptual analysis of stiffness," ISSN 0014–4819 Springer International (Springer–Verlag); *Experimental Brain Research*, vol. 79, No. 79, No. 1, pp. 150–156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25–44, May 2, 1993.

Snow et al., "Model–X Force–Reflecting–Hand–Controller," NT Control No. NPO–17851; JPL Case No. 7348, pp. 1–4 with 45 pages of attachments, Jun. 15, 1989.

Ouh–Young, "Force Display in Molecular Docking," Doctoral Dissertation, University of North Carolina at Chapel Hill, UMI Order No. 9034744, pp. 1–369, 1990.

Tadros, "Control System Design for a Three Degree of Freedom Virtual Environment Simulator Using Motor/Brake Pair Actuators," *MIT Archive*, pp. 1–88, Feb. 1990, archived Aug. 13, 1990.

Caldwell et al., "Enhanced Tactile Feedback (Tele–Taction) Using a Multi–Functional Sensory System," 1050–4729/93, pp. 955–960, 1993.

Adelstein et al., "Design and Implementation of a Force Reflecting Manipulandum for Manual Contro research," DSC–vol. 42, *Advances in Robotics*, pp. 1–12, 1992.

Gotow et al., "Controlled Impedence Test Apparatus for Studying Human Interpretation of Kinesthetic Feedback," WA11–11:00, pp. 332–337.

Stanley et al., "Computer Simulation of Interacting Dynamic Mechanical Systems Using Distributed Memory Parallel Processors," DSC–vol. 42, *Advances in Robotics*, pp. 55–61, ASME 1992.

Russo, "Controlling Dissipative Magnetic Particle Brakes in Force Reflective Devices," DSC–vol. 42, *Advances in Robotics*, pp. 63–70, ASME 1992.

Kontarins et al., "Display of High–Frequency Tactile Information to Teleoperators," *Telemanipulator Technology and Space Teleobotics*, Won S. Kim, Editor, Proc. SPIE vol. 2057, pp. 40–50, Sep. 7–9, 1993.

Patrick et al., "Design and Testing of A Non–reactive, Fingertip, Tactile Display for Interaction with Remote Environments," *Cooperative Intelligent Robotics in Space*, Rui J. deFiqueiredo et al, Editor, Proc. SPIE vol. 1387, pp. 215–222, 1990.

Adelstein, "A Virtual Environment System for the Study of Human Arm Tremor," *Ph.D. Dissertation*, Dept. of Mechanical Engineering, MIT, Jun. 1989, archived Mar. 13, 1990.

Bejczy, "Sensors, Controls, and Man–Machine Interface for Advanced Teleoperation," *Science*, vol. 208, No. 4450, pp. 1327–1335, 1980.

Bejczy et al., "Generalization of Bilateral Force–Reflecting Control of Manipulators," *Proceedings of Fourth CISM–IFToMM*, Sep. 8–12, 1981.

McAffee et al., "Teleoperator Subsystem/Telerobot Demonstrator: Force Reflecting Hand Controller Equipment Manual," JPL 1988, JPL D–5172.

Minsky, "Computational Haptics: The Sandpaper System for Synthesizing Texture for a Force–Feedback Display," *Ph.D. Dissertation*, MIT, Jun. 1995, archived Jul. 6, 1995.

Jacobsen et al., "High–Peformance, Dextrous Telerobotic Manipulator with Force Reflection," *Intervention/ROV '91 Conference & Exposition*, Hollywood, Florida, May 21–23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30–Oct. 1, 1992.

IBM Technical Disclosure Bulletin, "Mouse–Ball–Actuating Device with Force and Tactile Feedback," vol. 32, No. 9B, Feb. 1990.

Terry et al., "Tactile Feedback in a Computer Mouse," *Proceedings of Fourteenth Annual Northeast Bioengineering Conference, University of New Hampshire*, Mar. 10–11, 1988.

Howe, "A Force–Reflecting Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR –A Haptic display for speech perception by deaf and daf–blind individuals," *IEEE Virtual Reality Annual International Symposium*, Seattle, WA, Sep. 18–22, 1993.

Rabinowitz et al., "Multidimensional tactile displays: Identification of vibratory intensify, frequency, and contractor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12–15, 1980.

Bejczy et al., "A Laboratory Breadboard System for Dual–Arm Teleoperation," *SOAR '89 Workshop*, JSC, Houston, TX, Jul. 25–27, 1989.

Ouhyoung et al., "A Low–Cost Force Feedback Joystick and Its Use in PC Video Games," *IEEE Transactions on Consumer Electronics*, vol. 41, No. 3, Aug. 1995.

Marcus, "Touch Feedback in Surgery, " *Proceedings of Virtual Reality and Medicine The Cutting Edge*, Sep. 8–11, 1994.

Bejczy, et al., "Universal Computer Control System (UCCS) For Space Telerobots," CH2413–3/87/0000/0318501.00 1987 IEEE, 1987.

* cited by examiner

DIRECT VELOCITY ESTIMATION FOR ENCODERS USING NONLINEAR PERIOD MEASUREMENT

CROSS REFERENCE TO RELATED APPLICATIONS

This application claims the benefit of provisional patent application serial No. 60/082,637, filed Apr. 28, 1998 by Christopher J. Hasser, entitled "Direct Velocity Estimation for Optical Encoders Using Hardware-Based Nonlinear Period Measurement," which is incorporated herein by reference.

This invention was made with Government support under Contract Number M67004-97C-0026, awarded by the Department of Defense. The Government has certain rights in this invention.

BACKGROUND OF THE INVENTION

The present invention relates to velocity determination of a moving object based on sensed position.

Measurements of velocity for electromechanical systems may be obtained in a number of ways, including the use of dedicated sensors such as tachometers and the taking of derivatives of signals from position sensors such as potentiometers and optical encoders. Hardware and software approaches can calculate these derivatives. For example, a simple operational amplifier circuit can differentiate an analog potentiometer signal to output a velocity signal, or the same potentiometer signal may be differentiated in software. Both approaches introduce lag into the velocity estimate. Filtering in hardware or software to cope with the derivative's sensitivity to noisy sensor data further worsens the lag, sometimes to the point that the velocity data becomes useless.

Due to their optical, non-contact design, encoders have a long service life, low friction, excellent repeatability, and inherently digital outputs with low noise. These attributes have made them popular position sensors. In applications requiring velocity as well as position information, designers often would like to obtain velocity information from an optical encoder rather than accept the added expense of an analog velocity sensor and its associated analog-to-digital conversion electronics. Software techniques for doing so have existed for some time. Two possible approaches include measuring the change in position (number of encoder pulses) over a fixed period of time, and measuring the period of time required to attain a fixed position change (the period of one encoder pulse, for example).

The first technique, pulse counting, can be useful at higher encoder speeds where pulses occur frequently, leading to acceptable quantization error and dynamic range in the velocity measurement. For slower speeds seen in electromechanical applications such as haptic feedback or "force feedback" devices, this technique becomes problematic. Consider the extreme case where the encoder moves so slowly that only one pulse count occurs in the given time period. If speed gradually increases until two pulse counts are measured, estimated velocity will suddenly double. The quantization error in this case is almost 100%. The application of smoothing algorithms may help (or simply create lag-induced instability in some systems), but cannot eliminate this fundamental problem.

The second technique, period counting, appears more attractive for measurements of slower velocities. With the ability to measure an infinitely long period, the slowest velocity may be measured. The resolution of the time measurement will determine the fastest measurable velocity. The equation for period counting:

$$\omega = \frac{2\pi}{T} = \frac{2\pi}{\text{period}}$$

where $\omega$ is the angular speed of a rotating shaft. This technique has some implementation difficulties. Accurate period measurement requires an interrupt-driven time counter. Measuring time in this fashion with frequent encoder pulses and one or more sensing channels can severely tax a computer that must simultaneously handle other tasks (graphics, kinematics, modeling, etc.). It can also be costly on an embedded processor of more humble means. In addition to frequent interrupts, it requires an inversion to convert from period to velocity—this operation can be time-intensive or not available on low-end microcontrollers.

Principles of Optical Encoder Operation

Optical encoders use paired light sensors and light sources with mechanical interruptions to measure rotary or linear position. FIG. 1 is a diagram of an incremental rotary optical encoder 10 attached to a motor shaft 12 of a motor 14 to measure the angle of rotation of the shaft. A light source 16 emits a beam of electromagnetic energy toward a light sensor or detector 18 through an encoder disk 20 which is transparent or includes open slots. An encoder hub 22 couples the disk 20 to the shaft 12. See R. D. Klafter, T. A. Chmielewski, and M. Negin, "Robotic Engineering: An Integrated Approach," Prentice-Hall, Englewood Cliffs, N.J., 1989, incorporated herein by reference. FIG. 2 shows the face of the optical encoder disk 20, with a striped pattern 24 that provides periodic interruptions between the light source and light sensor as the motor shaft rotates.

The encoder 10 of FIG. 1 preferably uses two emitter-detector pairs (both emitters included in the light source 16 and both detectors included in the light sensor 18). If only one pair is used, the single output signal indicates motion, but cannot indicate which direction the encoder disk/shaft is turning. A practical encoder requires the addition of a second emitter-detector pair slightly offset from the first so that it produces a square wave pulse stream that is 90 (electrical) degrees out of phase with the first pulse stream. FIG. 3a is a diagrammatic illustration of the two signals 26 (channel A) and 28 (channel B) output by two detectors included in the light sensor 18 during clockwise rotation of the encoder disk 20. FIG. 3b is a similar illustration of the two signals 26 and 28 output during counterclockwise rotation of the encoder disk. Thus, the relative phases of the two signals provides an indication of the direction of rotation. The logic level outputs of the A and B channels of the incremental encoder are that A leads B when clockwise rotation occurs, and A lags B when counterclockwise rotation occurs.

FIG. 4 is a block diagram illustrating the components of a signal processing system 30 for an incremental optical encoder signal. Incremental optical encoders count pulses from the emitter-detector pairs in light source 16 and light sensor 18. A quadrature decoder state machine 32 receives the two channels from the detector pair and outputs a direction signal and a count strobe to a counter 34. Rotation of the disk 20 in one direction causes the counter to count up, and rotation in the other direction causes the counter to count down. Count and least significant bits are provided to a position register 36 which provides a position signal to a component that can process it, such as a controller or microprocessor. Because this arrangement can only measure a relative change from a starting position, if the application requires knowledge of absolute position the system must be powered up (or the counter reset) with the shaft in a known position. Inherently absolute optical encoders that use several pairs of light sensors and sources are also available. An absolute encoder has a more complicated Grey-code-based codewheel (or strip, in the case of a linear sensor) to interrupt the light beams. Though the encoder velocity techniques presented in this work can easily be applied to absolute encoders, a detailed description of their function is not presented. For further detail, see Klafter et al.

Encoders are useful in many applications. More specifically, computer interface devices such as joysticks, mice, track balls, steering wheels, etc. make use of encoders to determine the position of a user manipulatable object (manipulandum) in a workspace of the user object, and provide the position information to a host computer that is connected to the interface device. An encoder can be used to sense position of the manipulandum in one or more degrees of freedom. Force feedback interface devices are a form of interface device in which motion of the manipulandum is sensed and forces are output on the manipulandum using actuators such as motors. In some preferred force feedback interface device implementations, a local microprocessor, separate from the host computer, is included in the interface device to offload computational burden from the host computer. The local microprocessor can handle force computations and position processing, allowing the host to concentrate on running a host application and displaying environments on a display screen in part based on position information from the interface device.

The digital precision of encoders is even more valuable for use in force feedback interface devices, which often use velocity information in addition to position information describing motion of the manipulandum to determine and output forces on the manipulandum. Velocity determination of the manipulandum is essential for outputting realistic forces such as damping forces.

The prior art has used encoders for velocity measurement. M. Lemkin et al., "Velocity Estimation From Widely Spaced Encoder Pulses," American Control Conference, Seattle, Wash., 1996, pp. 998–1002, refers to a Luenberger observer-based estimator to enable velocity estimation from widely-spaced encoder pulses. Their work includes a finite state machine approach for slowly-moving systems. R. H. Brown, S. C. Schneider, M. G. Mulligan, "Analysis of algorithms for velocity estimation from discrete position versus time data," *IEEE Transactions on Industrial Electronics*, vol. 39, no. 1, pp. 11–19, 1992 investigates the performance of three different algorithms for velocity estimation from discrete position versus time data: Taylor series expansion, backward difference expansion, and least-squares fit. T. Ohmae, et al., "A Microprocessor-Controlled High-Accuracy Wide-Range Speed Regulator for Motor Drives," *IEEE Trans. On Industrial Electronics*, Vol. IE-29, No. 3, 1982, pp. 207–211, presents a microprocessor-controlled encoder velocity-based speed regulator for motor drives. K. Saito et al., "A Microprocessor-Controlled Speed Regulator with Instantaneous Speed Estimation for Motor Drives," *IEEE Trans. On Industrial Electronics*, Vol. 35, No. 1, 1988, presents an instantaneous speed estimation approach. R. L. Anderson et al., U.S. Pat. No. 5,740,083, Apr. 14, 1998, describes a method that appears to apply three different equations to process reciprocal velocity data in a microprocessor. P. Sagues, U.S. Pat. No. 4,639,884, Jan. 27, 1987, appears to be relevant to reciprocal velocity methods, as well as position interpolation, using evenly-spaced clock pulses. P. Bhatti et al., "Single Chip Velocity Measurement System for Incremental Optical Encoders," submitted to IEEE Transactions on Control Systems Technology, 1997, implements both pulse counting and period counting in an FPGA. For example, one method can automatically select between the best of the two methods (frequency counting for high velocities and period counting for low velocities).

The prior art has used a 1/T estimation to determine velocity, i.e., two successive positions of a moving object are obtained from an encoder and the difference in position is divided by the time period elapsing between positions, according to the standard velocity relation v=d/T. The traditional 1/T velocity estimation technique and its linear-with-time counting method have several drawbacks. First, 1/T velocity estimation requires a microprocessor or other controller to perform a division operation to obtain velocity. This can be costly in terms of computational resources on embedded microprocessors/microcontrollers, such as a microprocessor local to a force feedback interface device (or in a host computer). Further, it means that velocity information is not directly available to the digital hardware without first passing the information to a microprocessor or host computer (e.g. when performing damping calculations for damping forces in hardware, such as a "haptic accelerator" device provided on an interface device in addition to a local microprocessor, as described in U.S. Pat. No. 5,999,168).

Second, linear counting of encoder periods using constant time increments (e.g. a constant clock interval) creates a nonlinear mapping to velocity (see FIG. 5a, described below). This means that the discrete values of velocity obtainable from the discretized period measurements will not be distributed evenly throughout the velocity range. The nonlinear mapping has a serious practical implication: it concentrates velocity resolution at the lower velocities. This forces an increase in clock speed to allow acceptable resolution at high velocities. A faster clock speed causes the period counter to overflow more quickly, reducing the largest measurable period and thus increasing the slowest measurable speed. Viewed differently, the size of the counter represents the dynamic range. For long periods associated with slow velocities, a constant-rate counter still "uses up" counts (dynamic range) very fast, even though the high period resolution is wasted. In this way, the nonlinear velocity resolution distribution severely restricts dynamic range. The designer must settle for a slower maximum velocity in order to have adequate period-count resolution, or must settle for a faster minimum velocity in order to prevent counter overflow.

A different problem relates to force output by an actuator controlled by pulse width modulation (PWM) or digital output techniques. These systems provide discrete values to an actuator, where a single value is provided to the actuator to be output for a length of time, until the next discrete value is received and sent to the actuator. Stability problems can be encountered attributable to prior art zero-order hold systems, which receive a value and hold the actuator output at the received value until the next PWM value is received. Over and under-estimates of the required actuator force output at each discrete interval can add up to create instabilities. For example, the next value may be greatly different from the current held output force magnitude, causing a large, abrupt change in force output. This can be disconcerting to a user of a force feedback device, which expects to experience realistic forces.

SUMMARY OF THE INVENTION

The apparatus and method of present invention is directed to velocity determination of a moveable object using a nonlinear sensing technique. The technique allows a direct estimation of velocity to be provided to a controller or processor and increases the dynamic range of velocity sensing. A method and apparatus for providing continuous first-order force output decreases instabilities in actuator systems.

More particularly, a method of the present invention for determining a velocity of a moving object includes receiving a signal from an encoder indicating that the encoder has detected the passage of a point on a moving sensor element, such as a mark on an encoder disk. The encoder, for example, can include a pattern of marks which moves as the object moves, wherein passage of the marks is detected by the encoder to detect movement of the object. The provided signal can be a rising or falling edge signal. A counter is made to count down from a higher value to a lower value after the encoder signal has been received, where counts by the counter are made at a variable, nonlinear rate. The rate is faster when the count begins and gets slower as the count continues, thereby reducing the possibility that the counter will overflow before the next signal is received from the encoder. The value of the counter is output as a value directly related to the velocity of the object, where the value is a current value of the counter at the time a successive signal from the encoder is received.

The counter can be reset when another signal or pulse from the encoder is received, such that when a velocity of the moving object is greater, the counter is reset more quickly and the counting rate does not get as low as when the velocity of the object is lower, i.e. the count rate of the counter gets slower as the time interval between successive pulses gets longer. Thus, the count of the counter bears a direct linear relationship to the velocity of the object, i.e. the velocity bears an inverse relationship to a time period between the signals from the encoder. This allows the counter value to be directly proportional to velocity and increases the dynamic range of velocity estimation.

The counting rate is varied in one described embodiment by providing different divisors to a frequency divider, the frequency divider controlling when the counter makes another count. The frequency divider receives a high-frequency base clock signal and divides a frequency of the base clock signal by the divisor. A different divisor is provided to the frequency divider based on a current value of the counter. Preferably, the different divisors are stored in a look up table. The divisors can be determined by an iterative search of slopes to find a slope approximating a 1/T relationship; alternatively, the divisors can be determined from a $1/T^2$ relationship, where T is the time period between signals from the encoder. The signal from the encoder can be in one of two channels in a quadrature scheme, each of the channels directing signals from an associated detector included in the encoder. In a circuit implementation of the present invention, a decoder state machine can receive the signal from the encoder, and a velocity register can receive the output counter value and provide the value to a controller such as a microprocessor. A nonlinear period counter can include the above variable frequency divider, velocity counter, and lookup table. In one desired application, the moving object can be a manipulandum or member included in a force feedback interface device. Furthermore, the output value of the counter is used by a microprocessor or hardwired circuit to determine a force to be output to the object by actuators.

In a different method and apparatus of the present invention, values are provided to an actuator to output as forces. For example, the forces can be output as force sensations in a force feedback interface device. A first command to output a specified first force value is received, followed by a second command to output a specified second force value. The first and second values are differenced and the difference and a time period elapsing between the first and second commands are used to determine a rate of change of the force values. A force value is output as a force according to the rate of change until another command is received to output a specified third force value. Preferably, the commands are pulse width modulation (PWM) commands or Digital-to-Analog commands. The second force value can be stored in a counter and count pulses can be provided to the counter at the determined rate of change. The count pulses can be provided by a variable-rate pulse generator which divides a frequency of a base clock signal similar to the velocity estimation described above.

The present invention advantageously provides a velocity estimation apparatus and method which provides a nonlinear counter having a count that maps linearly to velocity of a measured object. This allows velocity resolution to be distributed more evenly in the velocity range, thereby increasing the dynamic range of the velocity determination and allowing a faster maximum velocity or a slower minimum velocity to be sensed than when used previous velocity determination techniques. The first order force output apparatus and method of the present invention allows a smoother, more continuous force output between the receiving of discrete force values, which in turn reduces the instability of the force output.

DETAILED DESCRIPTION OF PREFERRED EMBODIMENTS

The velocity estimation method and apparatus of the present invention is first described, followed by the method and apparatus for first-order hold force output of the present invention.

Nonlinear Period Measurement for Direct Estimation of Velocity

A method and apparatus of the present invention determines a velocity from encoder position signals in a substantially more efficient way that the methods of the prior art. The invention uses nonlinear period measurement to both eliminate the requirements for a division calculation and evenly distribute resolution in the velocity range. The present invention can be used in conjunction with both rotary and linear position encoders, and is suitable for use with force feedback interface devices (as described above). Especially suitable are force feedback interface devices including a local microprocessor, separate from a controlling host computer. Since the local microprocessor uses velocity estimations of a manipulandum moved by a user to determine many force sensations, the present invention has direct applicability to such applications. Such force feedback devices are described in greater detail in U.S. Pat. No. 5,734,373, incorporated herein by reference. Furthermore, other non-microprocessor-based circuits such as state machines or hardwired digital or analog circuits can be used with the present invention instead of a microprocessor. The velocity estimator of the present invention can thus detect motion of any object, where the object can be a manipulandum of an interface device (e.g., a mouse, joystick, steering wheel, track ball, sphere, cradle, etc.). The object can also be a member or a portion of a member of a mechanism that allows the manipulandum to move in one or more degrees of freedom.

Preferably, an optical encoder as described above is used to provide the sensor signals to the velocity estimating device of the present invention. As described above, such an encoder typically provides a pulse on a channel when a mark is detected by a detector of the sensor, where the "mark" can be an opaque mark within a pattern on an encoder disk or strip which blocks or reflects a beam of electromagnetic energy; or the "mark" can be a slot in a disk or strip which allows the beam to pass through to a detector. As described above, the period is determined by the time between successive pulses received from the encoder. In other embodiments, other types of sensors can be used, where, in general, the passage of a detectable point on a moving sensor element past a detector is sensed to determine the position of the moving object that is coupled to the moving sensor element. The points can be evenly-spaced in a pattern as is described for the marks in the optical encoder.

Nonlinear Period Measurement

Figure 1:
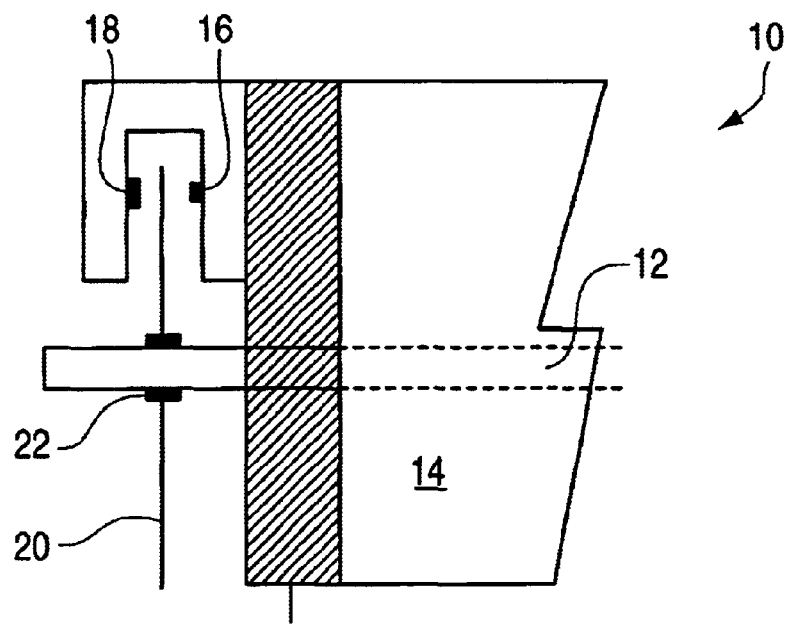
FIG. 1 is a side view of an optical encoder of the prior art.
Figure 2:
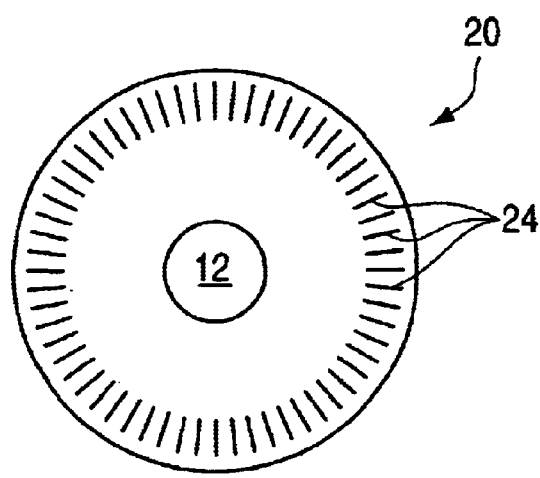
FIG. 2 is a front view of an encoder disk used in the encoder of FIG. 1.
Figure 3A:
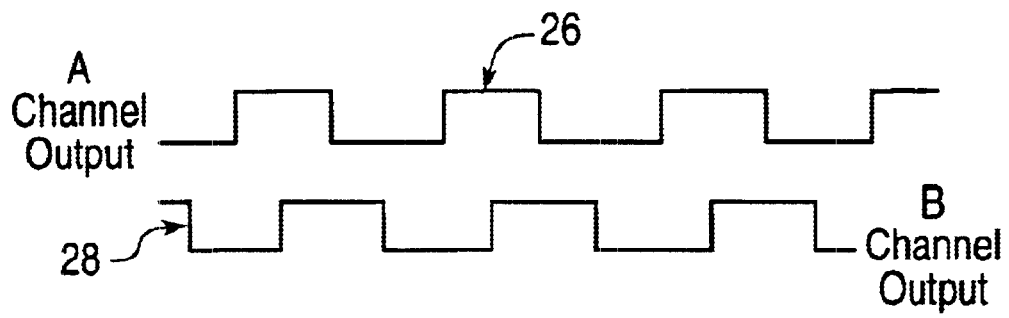
FIGS. 3a and 3b are diagrams of phase-shifted signals output by a quadrature encoder implementation of the encoder of FIG. 1.
Figure 3B:
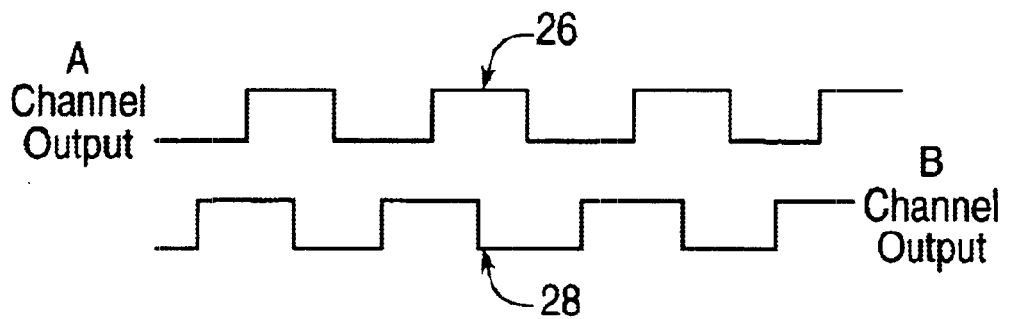
Figure 4:
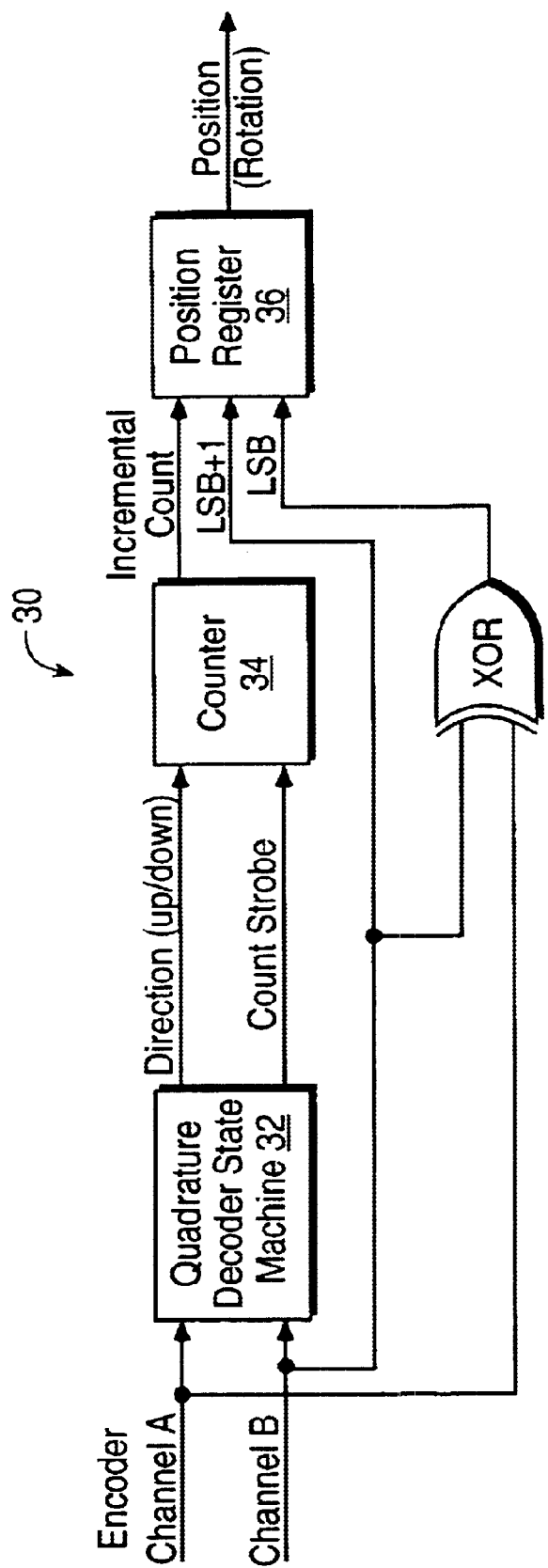
FIG. 4 is a block diagram of a processor circuit of the prior art for providing position information.
Figure 5A:
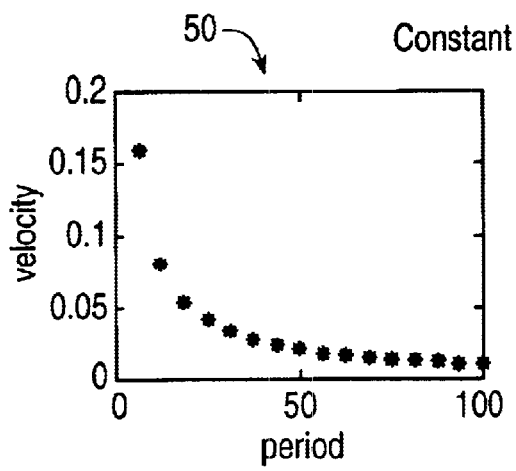
FIGS. 5a–5b are graphs illustrating the relationship between velocity and period and the velocity resolution distribution, respectively, of the prior art.
Figure 5B:
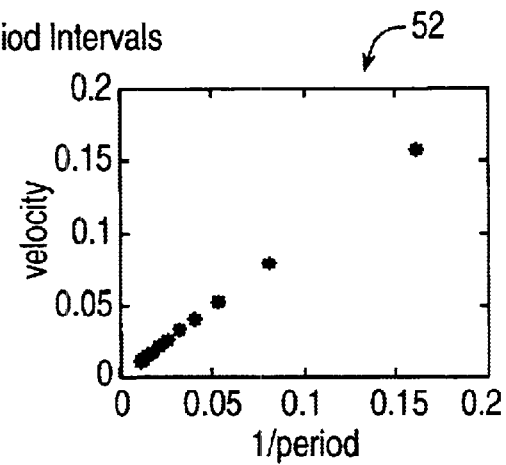

The plot 50 in FIG. 5a, showing the relationship between velocity and period, and the plot 52 in FIG. 5b, showing the relationship between velocity and the inverse of the period (velocity resolution distribution), illustrate the previous linear counting of encoder periods using constant time increments (e.g. a constant clock interval or rate), creating a nonlinear mapping of period to velocity. The constant clock interval causes the discrete values of velocity obtainable from the discretized period measurements to be unevenly distributed throughout the velocity range, as shown in plot 52 of FIG. 5b. This concentrates velocity resolution at the lower velocities, forcing an increase in clock speed to allow acceptable resolution-at high velocities. A faster clock speed, in turn, causes the period counter to overflow more quickly, raising the slowest measurable speed. The counting range of the counter, representing the dynamic range of the sensor, is used very quickly even at slow velocities, such that overflow of the counter occurs quickly. In this way, the nonlinear velocity resolution distribution severely restricts dynamic range. The designer must settle for a slower maximum velocity in order to have adequate period-count resolution, or must settle for a faster minimum velocity in order to prevent counter overflow.

Figure 5C:
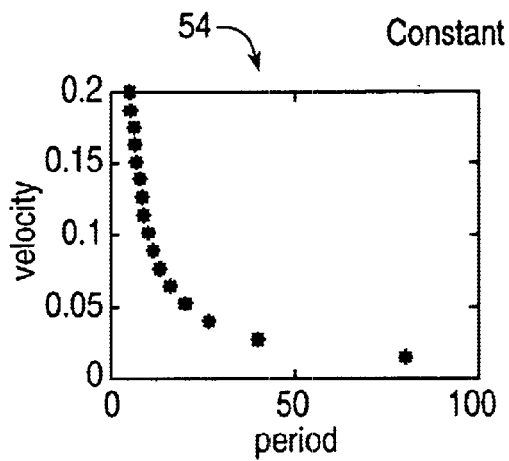
FIGS. 5c–5d are graphs illustrating the relationship between velocity and period and the velocity resolution distribution, respectively, of the present invention.
Figure 5D:
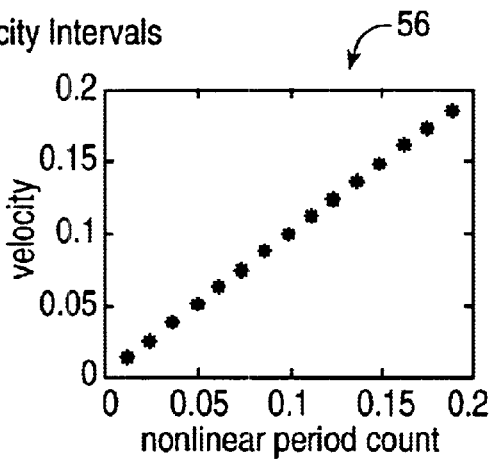

Plot 54 of FIG. 5c and plot 56 of FIG. 5d illustrate the effect in the present invention of evenly distributing the velocity resolution. Plot 54 shows the relationship of velocity to period, and plot 56 shows the relationship of velocity to the inverse of the period (the velocity resolution distribution). The present invention preferably creates a variable-rate counter that begins counting down (rather than up as in the prior art) very fast, then slows such that it replicates the curve in plot 54 of FIG. 5c, i.e. the count rate of the counter varies. Plot 56 of FIG. 5d shows the result of a linear mapping between the nonlinear period count and the velocity, with velocity resolution evenly distributed throughout the range.

In one preferred embodiment, a nonlinear period measurement scheme is implemented in hardware using a programmable logic device, application-specific integrated circuit (ASIC), embedded circuit on a microprocessor chip, or other circuit/component. The nonlinear device functions similarly to the linear period measurement system, but rather than counting up in a linear fashion to measure period, it counts down nonlinearly. As the period lengthens, it counts down more slowly. This nonlinearity mimics the 1/T curve, such that a high encoder frequency (velocity) will result in the appropriately high velocity estimate, while a low encoder frequency (velocity) will yield the corresponding low velocity estimate. The velocity estimation nonlinearity is essentially the inverse of the 1/T nonlinearity, yielding a linear relationship between estimated velocity and encoder frequency.

Figure 6:
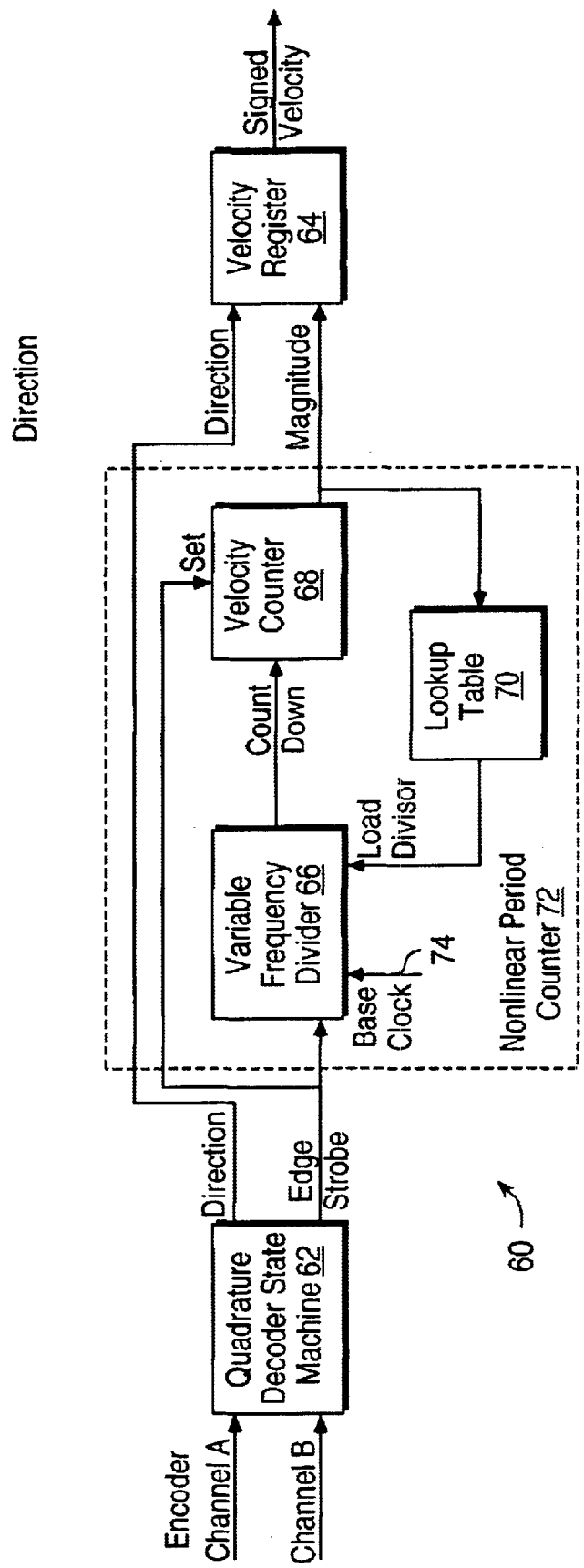
FIG. 6 is a block diagram of a processing circuit of the present invention for providing a direct velocity estimation according to nonlinear counting.

FIG. 6 is a block diagram of one embodiment 60 of the nonlinear period measurement logic used to provide direct estimation of velocity. Square waves from encoder channels A and B (as described above) enter a quadrature decoder state machine 62, which extracts direction and edge strobe information as is well known to those skilled in the art. The state machine 62 sends the direction bit to a velocity register 64 where a microprocessor, host, or other controller may access it. When an appropriate edge occurs, the quadrature decoder state machine 62 generates an edge strobe that sets (or resets) both a variable frequency divider 66 and a velocity counter 68.

An "appropriate" edge that causes the frequency divider 66 and velocity counter 68 to set can be different depending on the embodiment. In one embodiment, any rising or falling edge of pulses on either channel A or channel B can cause the first edge strobe (e.g. whichever edge is closest or first detected). Once the first edge strobe is output, only the same type of edge on that same channel is then tracked and counted. For example, if a rising edge of channel A causes the first strobe, then only rising edges on channel A are used to provide further edge strobes. This is done primarily for reasons of reliability, since only the same edge on the same channel can reliably be provided at a constant period relative to other periods. In a different embodiment, only rising edges of one predetermined channel is used to provide edge strobes; for example, the rising edges of channel B can be used and not the rising edges of channel A. In still other embodiments, rising (or falling) edges of both signals can be used, all edges of a single signal can be used, or all edges of all input signals can be used to provide edge strobes to the present invention.

In other embodiments, other encoder signals can be received. For example, in an embodiment having only one detector, a single signal is received. In other embodiments, additional sensor signals can be received. For example, an "octature" sensor can provide four sensor signals for greater resolution. Such octature sensors and sensors providing more than two channels are described in copending patent application Ser. No. 09/071,136, filed Apr. 30, 1998, incorporated herein by reference.

The variable frequency divider 62, velocity counter 68, and lookup table 70 together form a nonlinear period counter 72. When set by an edge strobe, the velocity counter 68 assumes its maximum count value. As time passes, the velocity counter counts down, driven by the base clock through the variable frequency divider 66. Since the count down frequency supplied by the variable frequency divider determines the slope of the velocity counter curve with time, the velocity counter can be made to follow an arbitrary time-dependent function. When the velocity counter reaches a new count, that count value is passed to a lookup table to determine what slope to implement until the counter reaches the following count. The lookup table can be implemented in memory, circuitry, or other storage device; for example, in one embodiment, the lookup table is provided as hard-wired logic on a PLD or ASIC, while in other embodiments the look up table can be provided in ROM or RAM onboard or offboard the chip or circuit implementing the device of the present invention. The lookup table 70 includes a series of different slopes, each associated with a different linear count value provided by the velocity counter. The nonlinear slope that is associated with the current count value from the counter is selected from the table. The lookup table 70 then passes the selected slope to the variable frequency divider 66 to be used as a frequency divisor. As the velocity counter 68 counts down, the lookup table 70 passes successively larger divisors to the variable frequency divider 66 so that the curve flattens out, tracking the 1/T function, thus slowing down the rate of the count. At any given moment, a successive edge strobe may cause the velocity counter value to be passed to the velocity register 64. This value represents a nonlinear period count—a measurement of the time between two edge strobes (encoder pulses).

Because the velocity counter 68 counts down rather than up, and in a particular nonlinear manner using the lookup table, the count bears a direct linear relationship to the velocity corresponding to the measured period. The controller (e.g. microprocessor) receiving the value from the velocity register 64 does not need to perform a divide operation to determine velocity; rather, the value received from the counter directly indicates velocity with no further processing required. This can significantly reduce the processing burden on the microprocessor, since it provides the lowest possible latency. When determining forces based on velocity of a manipulandum in a force feedback device, the low latency directly leads to greater stability in the force feedback output. For example, a damping force can be determined by multiplying a constant by the velocity.

Furthermore, the direct velocity estimation also allows other logic components to handle velocity determination without requiring complex circuitry. For example, a haptic accelerator in a force feedback device can use the method of the present invention to determine velocity and provide that velocity to a local microprocessor. Such embodiments are described in greater detail in co-pending patent application Ser. No. 08/804,535, incorporated herein by reference. Alternatively, a hardwired logic circuit or state machine in a force feedback device can receive the counter value from counter 68, can process the value to determine a force, and output the force value to a DAC or PWM component, which drives an actuator to output the force. The hardwired circuit can, for example, determine a damping force by multiplying a constant by the received velocity. Either a local microprocessor can supply the constant, or the constant can be stored and retrieved independently of any microprocessor (a microprocessor can be included in the device or not included; or the hardwired circuit can even be embedded on a the microprocessor chip). Such lower-cost embodiments are possible due to the direct velocity values supplied from the nonlinear sensor of the present invention to the hardwired circuits.

1/T Curve-Fitting Method

The velocity counter counts down with time, following the 1/T curve, so that the output count has an increasing period; the output represents a direct reading of estimated velocity. The frequency of the clock providing count-down commands to the velocity counter 68 determines the slope of the descending 1/T curve. At $T_{min}$, the slope equals −1. As the period lengthens, the slope of the curve becomes more shallow. The count-down rate (and thus the slope) is determined by the base clock modified by the variable frequency divider 66; the variable frequency divider can provide a wide range of count frequencies from a high-frequency base clock 74. The lookup table 70 includes the series of base clock divisors necessary for generating the sequence of slopes that will follow the 1/T curve. The velocity counter 68 thus acts as an integrator, and the sequence of slopes stored in the lookup table 70 is defined by the derivative of the 1/T curve, $-1/T^2$.

Figure 7:
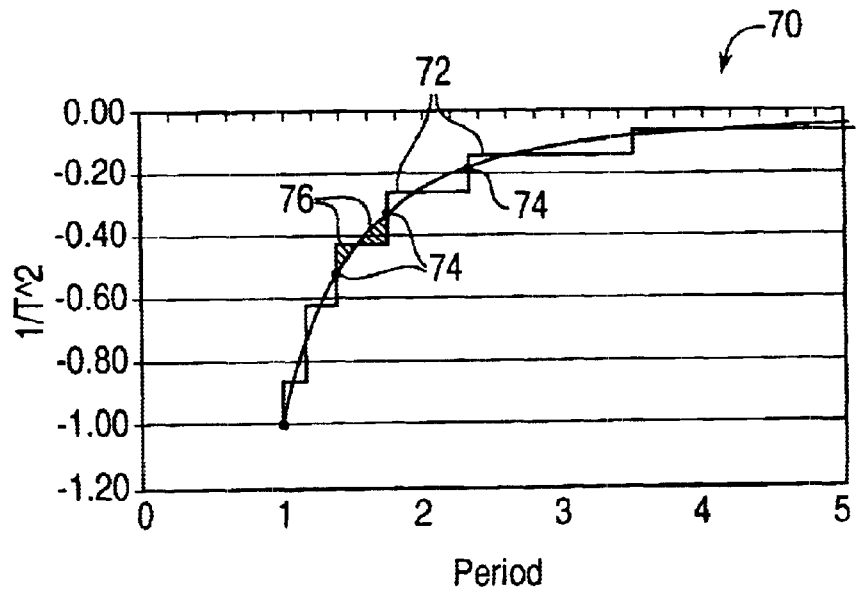
FIG. 7 is a graph illustrating a $1/T^2$ curve and the desired rate progression for the count-down velocity counter of the present invention.

FIG. 7 is a graph 70 illustrating the $1/T^2$ curve, which is the derivative of the 1/T curve, and the desired rate progression for the count-down velocity counter. In the described embodiment, the variable frequency divider can only divide by integer numbers. The available rates (slopes) are not only discrete, but spaced nonlinearly due to the fact that they rely on a divider for their generation (a phase-locked loop or other frequency multiplier-based scheme can be used to generate linearly-spaced rates). To provide proper generation of the 1/T curve in the velocity count-down timer, selection from the available slope values should be provided in a manner that minimizes error. The bold horizontal lines 72 in FIG. 7 are rate segments that show discretized slopes arbitrarily selected at the midpoints between known points 74 on the $1/T^2$ curve.

In an ideal case, the triangular error patches 76 shown in FIG. 7 would sum to zero, as the counter rate moves along the curve from −1 onward. The discrete slope values 72 are selected based upon a numerical tabulation of the integrated errors based upon available slopes. Such a calculation may have an error term for the current rate segment 72 (as shown in FIG. 7), as well as a carry-over integrated error term from previous segments 72 so that no errors are accumulated.

Figure 8:
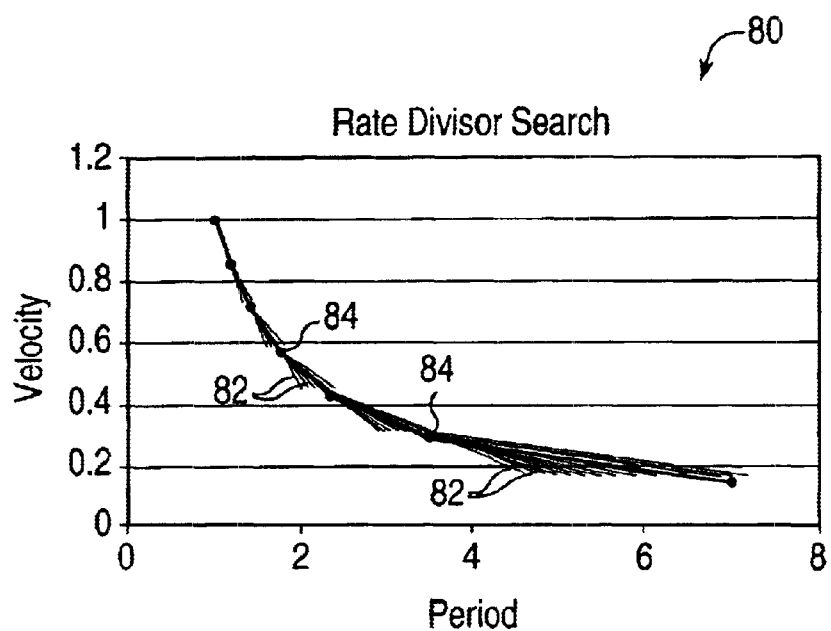
FIG. 8 is a graph illustrating an iterative approach of the present invention for searching and selecting slopes for use with the nonlinear counter of the present invention.

In the preferred implementation, a simpler approach is used. An iterative search algorithm searches through available slopes and picks the one slope for each segment that most nearly approximates the desired 1/T curve; this is the determined rate divisor. In many ways, this method can be mathematically similar to the ideal approach described above. FIG. 8 is a graph 80 illustrating this iterative approach for a simple 3-bit counter with seven rate segments. The multiple straight-line segments 82 at each point 84 indicate iterative slope guesses; with the shallowest guess usually representing an underestimation of slope, and the next-to-shallowest representing the nearest approximation. For example, the process starts with a steep slope guess, and with each iteration lowers the slope. When the slope iteration is too low, the just-previous iteration is used as the nearest approximation of slope. One method of determining the sequence of rates in the lookup table 70 (the curve shown in FIG. 8) is shown as program code in Appendix A.

Maximum Velocity Saturation Calculations

Once the clock rate divisors (slopes) have been calculated to fit a 1/T curve from $V_{max}$ (maximum measurable velocity, where $V_{max}=1/T_{min}$) to approximately zero velocity $V_{min}$ (where $V_{min}=1/T_{max}$), $T_{min}$ is determined in terms of clock cycles. This is because the clock rates and their divisors were calculated in order to fit the 1/T curve, without prior definition of $T_{min}$. $T_{min}$ is therefore a dependent parameter that can be derived by analysis after the curve fitting process is complete.

Integrating on the normalized V=1/T curve with respect to V:

$$T_{min} = \int_{\infty}^{1} \frac{-1}{v^2} \frac{dt}{dv} = \frac{1}{v}\Big|_{\infty}^{1} = 1$$

For a normalized V=1/T curve, with $V_{max}$ defined as 1, $$T_{min} = \frac{1}{V_{max}} = \frac{1}{1} = 1$$

Since the relationship between clock pulses and the curve is known for every point greater than $T_{min}$ a similar integration can be performed over a known region to calibrate the clock pulses to the normalized curve.

$$T_{ref} = \int_{1}^{V_a} \frac{-1}{V^2} \frac{dt}{dv} = \frac{1}{V}\Big|_{1}^{V_a} = \frac{1}{V_a} - \frac{1}{1}$$

Setting $T_{ref}=T_{min}$, and solving for $V_a$, $$V_a = \frac{1}{2}$$

Figure 9:
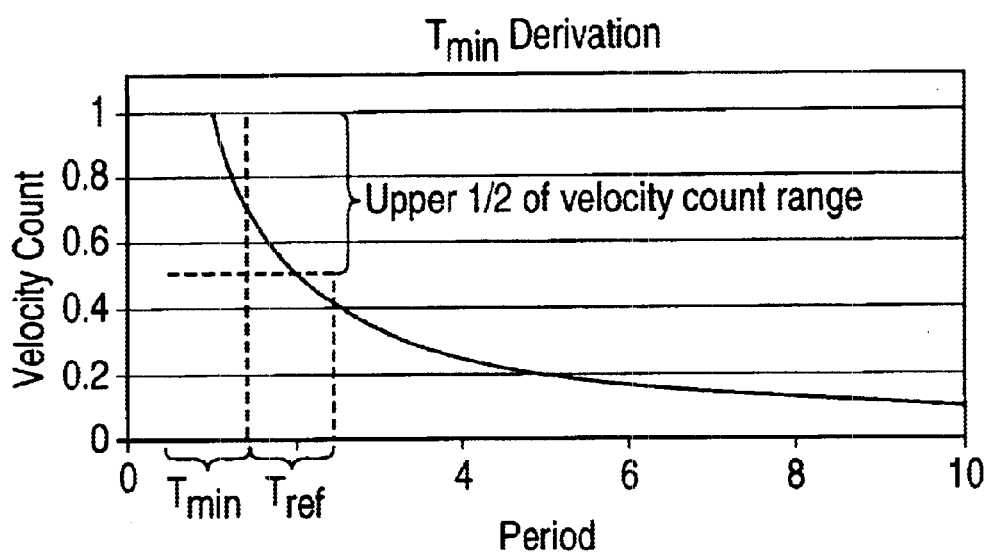
FIG. 9 is a graph illustrating a method for determining the fastest measurable velocity of the described embodiment of the present invention.

In other words, the time required for V to drop from 1 down to ½ of the normalized maximum velocity equals the minimum period measurable ($T_{min}$). FIG. 9 is a graph 90 which illustrates graphically this relationship, i.e., the use of $T_{ref}$ in the derivation of $T_{min}$. FIG. 9 demonstrates the method for determining fastest measurable velocity by summing the first half of the slope entries in the lookup table. The result determines the smallest T ($T_{min}$), and $V_{max}$ is determined as the inverse of $T_{min}$.

In order to determine how many base clock cycles are equivalent to $T_{min}$, the number of base clock cycles are counted which are required to count down through the upper half of the velocity count range, from V=1 (normalized $V_{max}$) to V=0.5 (normalized). This is equivalent to the sum of the first $(2^N-2)/2$ entries in the table of divisors determined by the search method described above.

To calibrate $T_{min}$ (and thus $V_{max}$) to real units, the equation below is applied:

$$T_{min} = \frac{\text{clock cycles}}{f_{\text{base\_clock}}}$$

Simulation and Results

Figure 10:
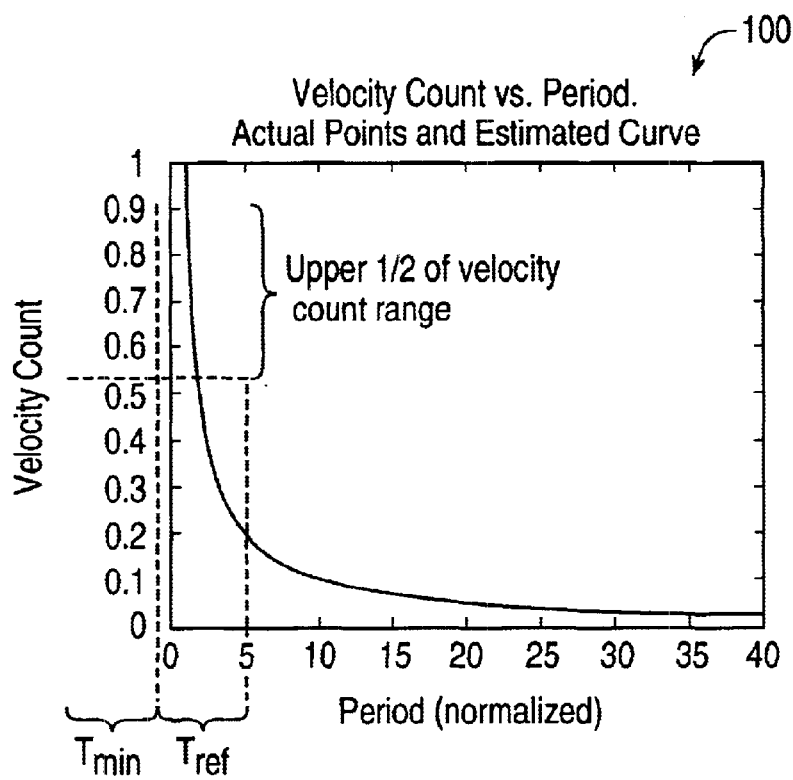
FIGS. 10 and 11 are graphs illustrating a nonlinear period curve and a linearity result, respectively, resulting from a simulation using the present invention.
Figure 11:
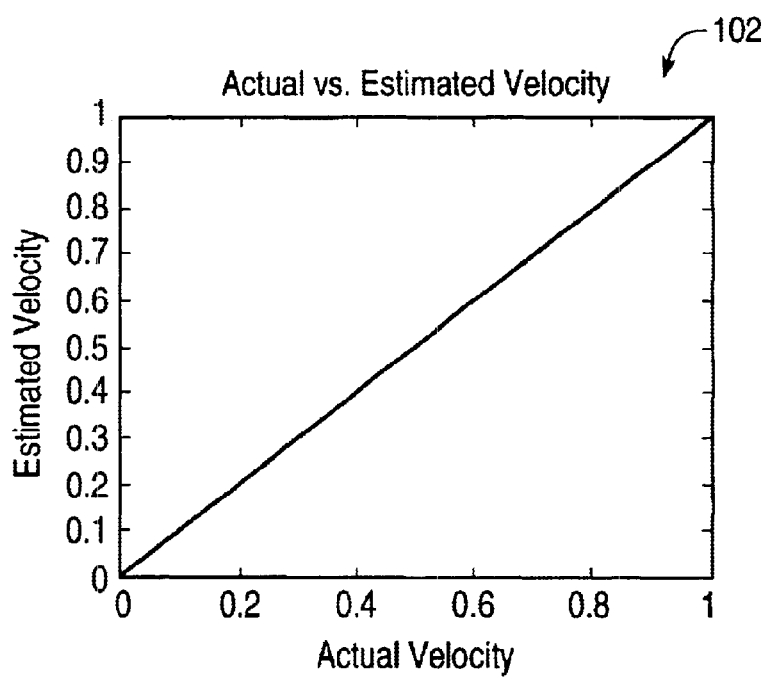

FIGS. 10 and 11 are graphs 100 and 102, respectively, which illustrate results from a computer simulation performed according to the methods described above. FIG. 10 shows the nonlinear period curve and FIG. 11 shows the simulated linearity result, which is quite close to the calculated result.

Figure 12:
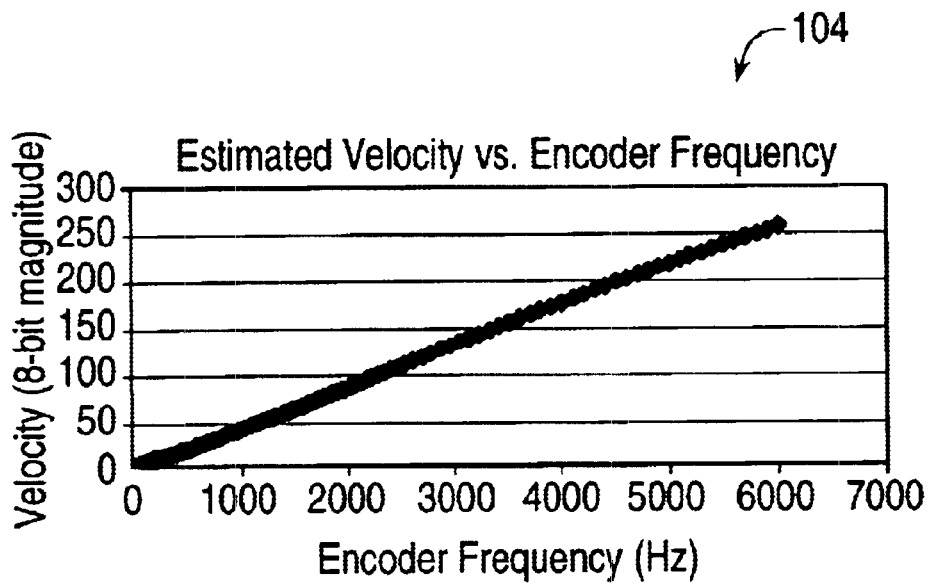
FIGS. 12 and 13 are graphs illustrating linearity results and velocity measurement error, respectively, resulting from a laboratory implementation of the present invention.
Figure 13:
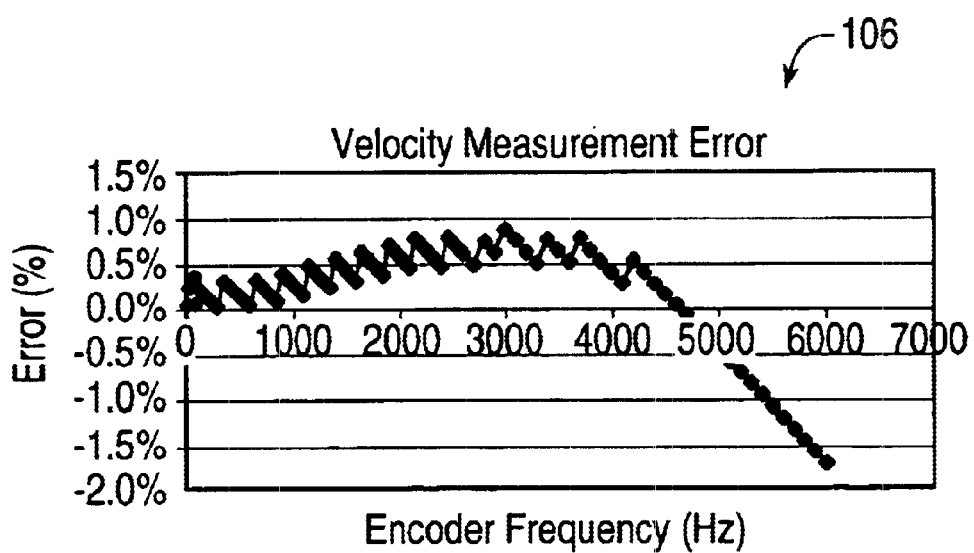

FIGS. 12 and 13 are graphs 104 and 106, respectively, which illustrate actual laboratory results from an implementation of the invention described above. FIG. 12 shows the linearity results and FIG. 13 shows the velocity measurement error.

An alternate embodiment of the present invention for directly providing velocity values from position values can use a table to store velocity values (or values proportionally related to velocity). For each possible period count (interval between two encoder pulses) that is read by the encoder, a corresponding velocity value is stored. The velocity value is provided directly to a processor, thereby alleviating the burden on the processor from performing a 1/T division to obtain a velocity value. Furthermore, the range of the velocities is evenly distributed through a range of periods as desired in the table, and a counter does not limit the velocities that can be sensed.

For example, an encoder period count received from the encoder is looked up in a lookup table to access a corresponding velocity value that has been associated with that period count. This embodiment requires a large lookup table to store all the possible velocity values, especially if a reasonable velocity resolution (e.g. 8 bits) is desired. For example, a logic truth table can be used to store the velocity values, with Kamaugh maps reducing the complexity of the truth table as is well known to those skilled in the art.

Embedded Digital First-order Hold Output

This aspect of the present invention relates to force output by actuators. The present invention preferably includes a digital device that generates a first-order hold output to a pulse-width modulated (PWM) or digital-to-analog output stage for driving a servo motor, voice coil, or other actuator, such as those actuators used in a force feedback interface device.

As is well known to those skilled in the art, PWM drives switch power transistors on and off rapidly to provide an amount of current to the actuator dependent on the ratio between the on time and the off time. In these and other digital systems, a single discrete value is provided to the actuator to be output for a length of time, until the next discrete value is received and sent to the actuator.

Discretized systems, particularly those employed for haptic feedback, can encounter stability problems attributable to zero-order hold systems. Zero-order hold systems receive a PWM value or DAC value from an actuator interface component such as a microprocessor and hold the actuator output at the received value until the next PWM value (or DAC value) is received. Over and under-estimates of the required actuator force output at each discrete interval can add up to create instabilities. For example, the next value may be greatly different from the current held output force magnitude, causing a large, abrupt change in force output. This can be disconcerting to a user of a force feedback device, which expects to experience realistic forces.

A first-order hold output stage offers many advantages over the zero-order hold system. The first form for the invention is a first-order hold PWM output stage which can be implemented using programmable logic devices, and is suitable for implementation in an application-specific integrated circuit (ASIC), including (but not limited to) a microprocessor with a first-order hold PWM output stage. The $1^{st}$-order hold stage can include many techniques similar to those used for the direct velocity estimation with nonlinear period measurement invention described above. Such techniques include a variable rate counter, as described below.

The first-order system requires the manipulation of two successive PWM commands. Once the two PWM values are received, they are differenced (one subtracted from the other). This difference is assumed to define the rate of change of the PWM output, and the system then acts to perpetuate this constant rate of change until the next PWM command is received. The effective PWM output can be changed, for example, by placing the original value into a counter, with count-up or count-down commands provided at a rate determined by the $1^{st}$-order hold rate. The effective rate can be updated more often than the PWM command rate—e.g., 8–16 times more often, or higher. The counting impulses are provided by a variable-rate pulse generator similar to the variable-rate clock described in the velocity measurement embodiments above. Thus, the first-order hold system provides an output force that more closely follows a continuous force waveform than the zero-order hold system, since the first-order hold system outputs a varying force having a rate of change based on previously received values, i.e. the first-order hold system can output a changing force before receiving new PWM values, unlike the zero-order system that requires a new PWM value to output a different force.

While this invention has been described in terms of several preferred embodiments, it is contemplated that alterations, permutations and equivalents thereof will become apparent to those skilled in the art upon a reading of the specification and study of the drawings. Furthermore, certain terminology has been used for the purposes of descriptive clarity, and not to limit the present invention. It is therefore intended that the following appended claims include all such alterations, permutations, and equivalents as fall within the true spirit and scope of the present invention.

APPENDIX A

```
% search2.m
% Derived from search.m, 18 Feb 98, C. J. Hasser
% This m-file will use a search algorithm to find successive slopes
% to match the 1/x curve
% With 128 rate segments (7 bits) would need 17-bit velocity divider.
% Can linearly interpolate to get more bits, but that won't work for
% slowest segment. Will need 7 bit state machine for 128 rate segments.
% Modified from search.m on 24 Mar 98 to apply curve over one less
% velocity interval. (e.g. from 0 to 254 instead of 0 to 255.) In this
% example, 255 is used to indicate a velocity greater than the maximum
% measurable.
Clear
% M = Number of rate segments (number of different slopes)
log2M = 8
M = 2 ^ log2M - 2;
NUM = 16;
%  Construct Vector of evenly-spaced velocity points and vector of
% corresponding periods
vel_points = [1: (-1/M):0];
time_points = 1./vel_points;
% Make last time a zero crossing (estimate a slope-a bit of a guess)
% A decent approximation for this last slope could take some more
% effort.
time_points (M + 1) = 4*time points(M) + time_points(M - 1);
% Draw "actual" 1/x curve
RES = 4;
P = RES*M;
y = [1: (-1/P):1/P];
x = 1./y;
figure (1)
plot (time_points, vel_points, '.');
hold on
plot (x,y,'-');
xlabel ('period (normalized)');
ylabel ('velocity count');
title ('Vel Count vs. Period: Actual Points and Estimated Curve');
axis ([0 40 0 1]);
```

APPENDIX A-continued

```
% Determine slopes with integer-divisor constraint
time_est(1) = time_points(1);
vel_est = vel_points;
denom_guess = 10;
for i = 1:M
    i
    time_guess = 0; % initialize
    % For the current velocity (current value of i)
    % iteratively increase slope denominator, calculating corresponding
    % time (given velocity and calculated slope for that denom. guess).
    % Pick largest denom. that results in a time not larger than the
    % true time on the 1/T curve.
    while time_guess < time_points(i + 1),
        slope_guess = -NUM/denom_guess;
        % Derive expression below from slope = rise/run
        % time_guess is last time, plus rise (-1/M) divided by slope.
        time_guess = time_points(i) + (-1/M)/slope_guess;
        denom_guess = denom_guess + 1;
    end
    denominator(i) = denom_guess - 2;
    denom_guess = denominator(i); % Use the current denom.
    as next guess
    time_est(i + 1) = time guess;
end
slope = -NUM./denominator
plot (time_est, vel_est, '-');
vel_interp = y;
time_interp = interp1(vel_est, time_est, vel_interp);
figure (2)
plot (time_interp, vel_interp, '.');
hold on
plot (time_est, vel_est, '*');
xlabel ('period');
ylabel ('velocity count');
title('Vel Count vs. Period: Actual and Estimated Points');
figure (3)
plot (y, 1./time_interp);
xlabel ('Actual Velocity');
ylabel ('Estimated Velocity');
title ('Actual vs. Estimated Velocity');
hold on
plot ([0 1], [0 1], '--');
```

What is claimed is:

1. A method, comprising:
   receiving a signal from a sensor indicating displacement of a moving sensor element based on a movement of an object;
   counting down from a first value to a lower value after the signal has been received, the counting being at a predetermined variable rate, the rate decreasing as the count continues; and
   outputting a velocity value of said counter as a value related to a velocity of the object, the velocity value being a current value of the counter when a successive signal from the sensor is received.

2. The method of claim 1, wherein the counting rate is varied by providing one of a plurality of divisors to a frequency divider, the frequency divider controlling when the counter makes another count.

3. The method of claim 2, wherein the plurality of divisors are stored in a look up table.

4. The method of claim 3, wherein said plurality of divisors are determined from a $1/T^2$ relationship, T being the time period between signals from the sensor.

5. The method of claim 3, wherein the plurality of divisors are determined by an iterative search of slopes to find the slope approximating a 1/T relationship.

6. The method of claim 2, wherein the frequency divider receives a high-frequency base clock signal and divides a frequency of the base clock signal by one of the plurality of divisors.

7. The method of claim 6, wherein a different divisor of the plurality of divisors is provided to the frequency divider based on a current value of the counter.

8. The method of claim 1, wherein the sensor is a digital encoder, and the moving sensor element includes at least one mark, said signal provided by said encoder being one of a rising edge signal and a falling edge signal, and passage of said at least one mark being detected by the encoder to detect movement of the object.

9. The method of claim 8, wherein the encoder includes a pattern having a plurality of the marks, which moves as the object moves.

10. The method of claim 8, wherein the signal from the encoder can be in one of two channels, each of the channels directing signals from an associated detector included in the encoder.

11. The method of claim 1, wherein the counter is reset when another signal from the encoder is received, such that the rate at which the counter is reset and the counting rate are proportional to the velocity of the object.

12. The method of claim 1, wherein the count of the counter bears a direct linear relationship to the velocity of the object, the velocity bearing an inverse relationship to a time period between the signals from said encoder.

13. The method of claim 1, wherein the moving object is a moving member of a linkage in a haptic feedback interface device.

14. The method of claim 1, wherein the output value of the counter is used by a non-microprocessor-based circuit to determine a damping force to be output to said object by at least one actuator.

15. The method of claim 1, wherein the output value of the counter is used by a microprocessor to determine a damping force to be output to the object by at least one actuator.

16. An apparatus, comprising:

a decoder state machine that receives a signal from an encoder, the signal having a pulse indicating movement of an element of the encoder, based on movement of an object; and a nonlinear period counter coupled to said decoder state machine and configured to receive an indication of said pulse therefrom, said nonlinear period counter configured to count down from a first value to a lower value and configured to be reset to the first value when the indication of the pulse is received, a rate of said counter being predetermined, variable and decreasing as said counter counts down, thereby increasing the dynamic range of velocity estimation, said counter being configured to output the lower value based on a successive pulse being received by said decoder state machine, said lower value being related to said velocity of said object.

17. The apparatus of claim 16, wherein said nonlinear period counter includes:

a variable frequency divider, said frequency divider configured to send out a count signal at a variable rate; and a velocity counter coupled to said variable frequency divider, said velocity counter configured to count from said first value to said lower value, after said count signal is received from said variable frequency divider.

18. The apparatus of claim 17, wherein said nonlinear period counter further includes a lookup table, said lookup table configured to provide different divisors to said variable frequency divider, said variable frequency divider configured to divide a base clock signal by said received divisors to change said rate of outputting said count signal.

19. The apparatus of claim 18, wherein said lookup table stores divisors that have been determined based on a $1/T^2$ relationship, T being the time period between successive pulses.

20. The apparatus of claim 16, wherein said counting rate follows a $1/T$ relationship, T being a time period between said pulse and the successive pulse.

21. The apparatus of claim 16, further comprising a velocity register, said counter value being passed to said velocity register when the successive pulse is received.

22. The apparatus of claim 16, wherein said decoder state machine is a quadrature decoder state machine configured to receive two quadrature detector signals from said encoder.

23. The apparatus of claim 16, wherein said encoder is an optical encoder that senses motion of said object, a pattern of evenly-spaced marks being provided on an moving encoder element, the passage of one or more of said marks being detected as said object moves.

24. A method, comprising:

receiving a signal from a sensor indicating displacement of a moving sensor element based on movement of an object;

counting down from a first value to a lower value after the signal has been received, the counting being at a variable rate, the rate decreasing as the count continues, the counting rate being varied by providing one of different divisors to a frequency divider, the frequency divider controlling when the counter makes another count, the different divisors being stored in a look up table; and outputting the value of the counter as a value directly related to a velocity of the object, the value being a current value of the counter when a successive signal from the sensor is received.

25. The method of claim 24, wherein the divisors are determined from a $1/T^2$ relationship, T being the time period between signals from the sensor.

26. The method of claim 24, wherein the divisors are determined by an iterative search of slopes to find the slope approximating a $1/T$ relationship.

27. The method of claim 24, wherein the counting rate follows a $1/T$ relationship, T being a time period between said signal and a successive signal.

28. The method of claim 24, wherein the variable counting rate of the counter is predetermined.

* * * * *